United States Patent
Ha

(10) Patent No.: US 12,210,158 B2
(45) Date of Patent: Jan. 28, 2025

(54) OPTICAL DEVICE FOR AUGMENTED REALITY USING A PLURALITY OF IMAGES FOR AUGMENTED REALITY

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 671 days.

(21) Appl. No.: 17/436,971

(22) PCT Filed: Mar. 12, 2020

(86) PCT No.: PCT/KR2020/003423
§ 371 (c)(1),
(2) Date: Sep. 7, 2021

(87) PCT Pub. No.: WO2020/197134
PCT Pub. Date: Oct. 1, 2020

(65) Prior Publication Data
US 2022/0171191 A1    Jun. 2, 2022

(30) Foreign Application Priority Data

Mar. 26, 2019    (KR) ........................ 10-2019-0034321

(51) Int. Cl.
*G02B 27/01* (2006.01)
(52) U.S. Cl.
CPC .. *G02B 27/0172* (2013.01); *G02B 2027/0127* (2013.01); *G02B 2027/0178* (2013.01)
(58) Field of Classification Search
CPC .. G02B 27/0093; G02B 27/01; G02B 27/017; G02B 27/0101; G02B 27/0172; G02B 27/143; G02B 27/283; G02B 2027/013; G02B 2027/0105; G02B 2027/0107; G02B 2027/0125; G02B 2027/0127; G02B 2027/0174; G02B 2027/0178
See application file for complete search history.

(56) References Cited

U.S. PATENT DOCUMENTS

| | | |
|---|---|---|
| 5,982,343 A | 11/1999 | Iba et al. |
| 8,366,279 B2 | 2/2013 | Inoguchi et al. |
| 10,739,586 B1 * | 8/2020 | Yoon .................... G02B 5/3025 |

(Continued)

FOREIGN PATENT DOCUMENTS

| | | |
|---|---|---|
| KR | 101660519 B1 | 9/2016 |
| KR | 101894556 B1 | 10/2018 |

*Primary Examiner* — Sultan Chowdhury
(74) *Attorney, Agent, or Firm* — Rabin & Berdo, P.C.

(57) ABSTRACT

The present invention relates to an optical device for augmented reality using a plurality of images for augmented reality, the optical device including: a plurality of image output units configured to output respective rays of image light corresponding to images for augmented reality; a plurality of reflective units configured to transfer the respective rays of image light to the pupil of an eye of a user; and an optical means in which the reflective units are disposed and configured to transmit at least part of image light output from a real object therethrough; wherein each of the plurality of reflective units corresponds to at least any one of the plurality of image output units, and transfers image light corresponding to an image for augmented reality and output from the corresponding image output unit to the pupil of the eye of the user.

19 Claims, 10 Drawing Sheets

(56) References Cited

U.S. PATENT DOCUMENTS

| | | | |
|---|---|---|---|
| 2011/0057863 A1* | 3/2011 | Sugihara | G02B 27/0172 345/8 |
| 2011/0176120 A1* | 7/2011 | Geissler | G03B 21/28 353/97 |
| 2017/0176753 A1 | 6/2017 | Shi et al. | |
| 2018/0367769 A1 | 12/2018 | Greenberg | |
| 2019/0018247 A1* | 1/2019 | Gao | G02B 27/0172 |
| 2019/0094444 A1* | 3/2019 | Ma | G02B 27/0081 |
| 2019/0310478 A1* | 10/2019 | Marin | A61B 3/02 |
| 2020/0203324 A1* | 6/2020 | Shin | H01L 25/0753 |
| 2022/0171191 A1* | 6/2022 | Ha | G02B 27/0172 |

* cited by examiner

OPTICAL DEVICE FOR AUGMENTED REALITY USING A PLURALITY OF IMAGES FOR AUGMENTED REALITY

TECHNICAL FIELD

The present invention relates to an optical device for augmented reality, and more particularly to an optical device for augmented reality using a plurality of images for augmented reality that is capable of providing a wide screen by using a plurality of images for augmented reality.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means, such as a prism, that reflects or refracts a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length. However, these technologies also have a problem in that a user needs to perform a separate operation in order to adjust focal length or hardware such as a separate processor and software for controlling focal length are required.

In order to overcome these problems of the conventional technologies, the present applicant has developed an optical device for augmented reality by projecting a virtual image onto the retina through the pupil using a reflective unit having a smaller size than a human pupil, as described in the following prior art document.

FIG. 1 is a diagram showing an optical device for augmented reality such as that disclosed in the prior art document.

Referring to FIG. 1, an image output unit 30 is a means for outputting image light corresponding to an image for augmented reality, and may be implemented as, e.g., a small-sized display device. A reflective unit 20 provides the image for augmented reality to a user by reflecting image light corresponding to the image for augmented reality, output from the image output unit 30, to the pupil of the user.

An optical means 10 is a means for transmitting at least part of the image light output from a real object, therethrough, and may be, e.g., a lens of eyeglasses. The reflective unit 20 is embedded inside the optical means 10. A frame unit 40 is a means for fixing and supporting both the image output unit 30 and the optical means 10.

The reflective unit 20 of FIG. 1 is formed to have a smaller size, i.e., 8 mm or less, than the human pupil. By forming the reflective unit 20 to be smaller than the pupil as described above, the depth of field for light entering the pupil through the reflective unit 20 can be made almost infinite, i.e., considerably deep. Here, the depth of field refers to a range within which an image for augmented reality is recognized as being in focus. When the depth of field increases, a focal length for an image for augmented reality increases accordingly. Thus, even when a user changes the focal length for the real world while gazing at the real world, an image for augmented reality is always recognized as being in focus regardless of such a change. This may be viewed as a kind of pinhole effect. Accordingly, the optical device for augmented reality can always provide a clear virtual image for an image for augmented reality even when a user changes the focal length while gazing at a real object in the real world.

However, although this prior art can increase the depth of field and obtain a pinhole effect, there is a problem in that the field of view is narrow because one image output unit is used.

Prior Art Document

Korean Patent No. 10-1660519 (published on Sep. 29, 2016)

DISCLOSURE

Technical Problem

The present invention has been conceived to overcome the above-described limitations, and an object of the present invention is to provide an optical device for augmented reality using a plurality of images for augmented reality that is capable of providing a wide field of view by using a plurality of images for augmented reality.

Another object of the present invention is to provide an optical device for augmented reality using a plurality of images for augmented reality that is capable of providing a plurality of images for augmented reality by using one image output unit or a plurality of image output units.

Still another object of the present invention is to provide an optical device for augmented reality using a plurality of images for augmented reality that is capable of efficiently providing a plurality of images for augmented reality having different resolutions.

Technical Solution

In order to accomplish the above objects, the present invention provides an optical device for augmented reality using a plurality of images for augmented reality, the optical device including: a plurality of image output units configured to output respective rays of image light corresponding to images for augmented reality; a plurality of reflective units configured to transfer the respective rays of image light corresponding to the images for augmented reality and output from the plurality of image output units to a pupil of an eye of a user by reflecting the image light toward the pupil, thereby providing the images for augmented reality to the user; and an optical means in which the reflective units are disposed and configured to transmit at least part of image light output from a real object therethrough toward the pupil of the eye of the user; wherein each of the plurality of reflective units corresponds to at least any one of the plurality of image output units, and transfers image light corresponding to an image for augmented reality and output from the corresponding image output unit to the pupil of the eye of the user by reflecting the image light toward the pupil.

In this case, the size of the reflective units preferably formed to be 4 mm or less.

Further, the image output units may divide one image for augmented reality into a plurality of partial images for augmented reality, and may output respective rays of image light corresponding to the plurality of partial images for augmented reality.

Furthermore, each of the plurality of reflective units may be disposed at a different inclination angle with respect to a surface of the optical means between a corresponding one of the image output units and the pupil so that each of the reflective unit can reflect image light from the corresponding image output unit toward the pupil respectively.

Furthermore, the reflective units may be disposed inside the optical means or on the surface of the optical means.

Furthermore, at least a part of the reflective units may be composed of a plurality of reflective modules having a size of 4 mm or less.

Furthermore, each of reflective modules constituting one of the reflective units may be arranged such that image light corresponding to an image for augmented reality and output from a corresponding one of the image output units is not blocked by one or more other reflective modules.

Furthermore, image light corresponding to an image for augmented reality and output from at least a part of the plurality of image output units may be transferred to a corresponding one of the reflective units after being reflected at least once from an inner surface of the optical means.

Furthermore, at least a part of the plurality of reflective units may be disposed in a central portion of the optical means, and one or more reflective units other than the reflective unit disposed in the central portion of the optical means may be arranged to surround the reflective unit disposed in the central portion of the optical means. Furthermore, each of the reflective units arranged to surround the reflective unit disposed in the central portion of the optical means may be composed of a plurality of reflective modules.

Furthermore, the plurality of image output units may output respective rays of image light corresponding to different images for augmented reality.

Furthermore, the plurality of image output units may output respective rays of image light corresponding to images for augmented reality having different resolutions.

Furthermore, a resolution of an image for augmented reality corresponding to image light transferred to the pupil by the reflective unit disposed in the central portion of the optical means may be higher than a resolution of an image for augmented reality corresponding to image light transferred to the pupil by the reflective units disposed to surround the reflective unit disposed in the center portion of the optical means.

Furthermore, the plurality of image output units may output respective rays of image light corresponding to images for augmented reality so that the images for augmented reality have different angular resolutions.

According to another aspect of the present invention, there is provided an optical device for augmented reality using a plurality of images for augmented reality, the optical device including: one or more image output units configured to output image light corresponding to images for augmented reality, wherein at least any one of the image output units outputs image light corresponding to a plurality of images for augmented reality; a plurality of reflective units configured to transfer the image light corresponding to the plurality of images for augmented reality output from the image output units to a pupil of an eye of a user by reflecting the image light toward the pupil, thereby providing the images for augmented reality to the user; and an optical means in which the reflective units are disposed and configured to transmit at least part of image light output from a real object therethrough toward the pupil of the eye of the user; wherein each of the plurality of reflective units corresponds to at least any one of the plurality of images for augmented reality output from the image output units, and transfers image light corresponding to the corresponding image for augmented reality to the pupil of the eye of the user by reflecting the image light toward the pupil.

In this case, the size of the reflective units may be formed to be 4 mm or less.

Furthermore, the image output units may divide one image for augmented reality into a plurality of partial images for augmented reality, and may output image light corresponding to the plurality of partial images for augmented reality.

Furthermore, each of the plurality of reflective units may be disposed at a different inclination angle with respect to a surface of the optical means between a corresponding one of the image output units and the pupil so that the reflective unit can reflect image light corresponding to an image for augmented reality from the corresponding image output unit toward the pupil.

Furthermore, the reflective units may be disposed inside the optical means or on the surface of the optical means.

Furthermore, at least a part of the reflective units may be composed of a plurality of reflective modules having a size of 4 mm or less.

Furthermore, each of reflective modules constituting one of the reflective units may be arranged such that image light corresponding to an image for augmented reality and output from a corresponding one of the image output units is not blocked by one or more other reflective modules.

Furthermore, image light corresponding to an image for augmented reality and output from at least a part of the plurality of image output units may be transferred to a corresponding one of the reflective units after being reflected at least once from an inner surface of the optical means.

Advantageous Effects

According to the present invention, there can be provided the optical device for augmented reality using a plurality of images for augmented reality that is capable of providing a wide field of view by using a plurality of images for augmented reality.

Furthermore, according to the present invention, a plurality of images for augmented reality can be provided using one image output unit or a plurality of image output units.

Moreover, according to the present invention, a plurality of images for augmented reality having different resolutions can be efficiently provided, and thus only some image output units can be implemented using expensive high-resolution devices. Accordingly, there is an advantage in that the manufacturing cost of the optical device can be reduced.

BEST MODE

Embodiments of the present invention will be described in detail below with reference to the accompanying drawings.

Figure 1:
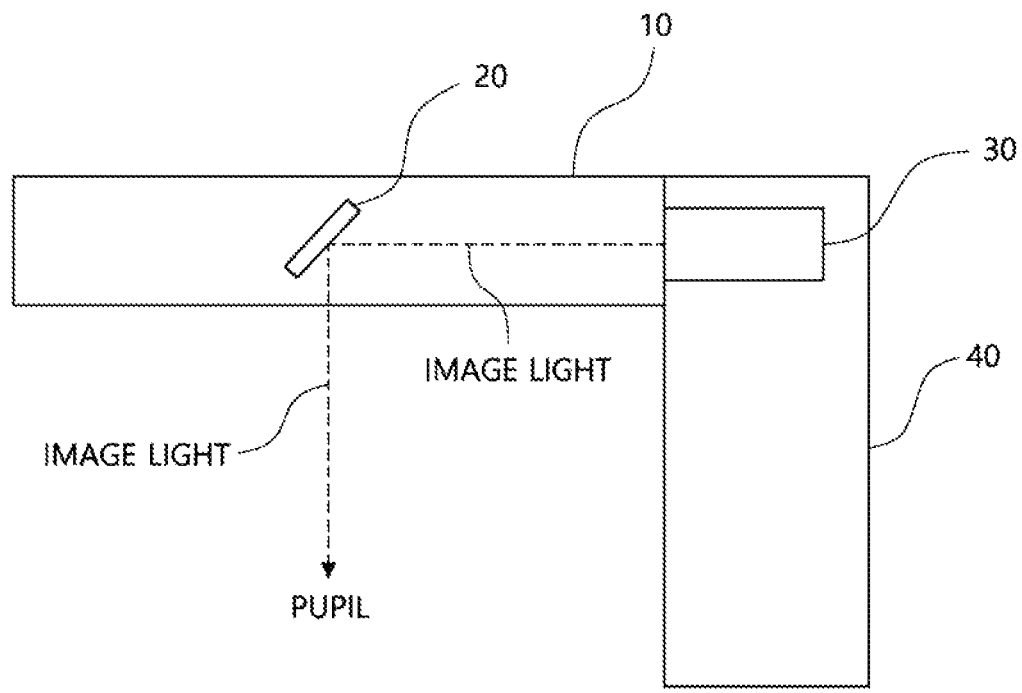
FIG. 1 is a diagram showing an optical device for augmented reality such as that disclosed in the prior art document.
Figure 2:
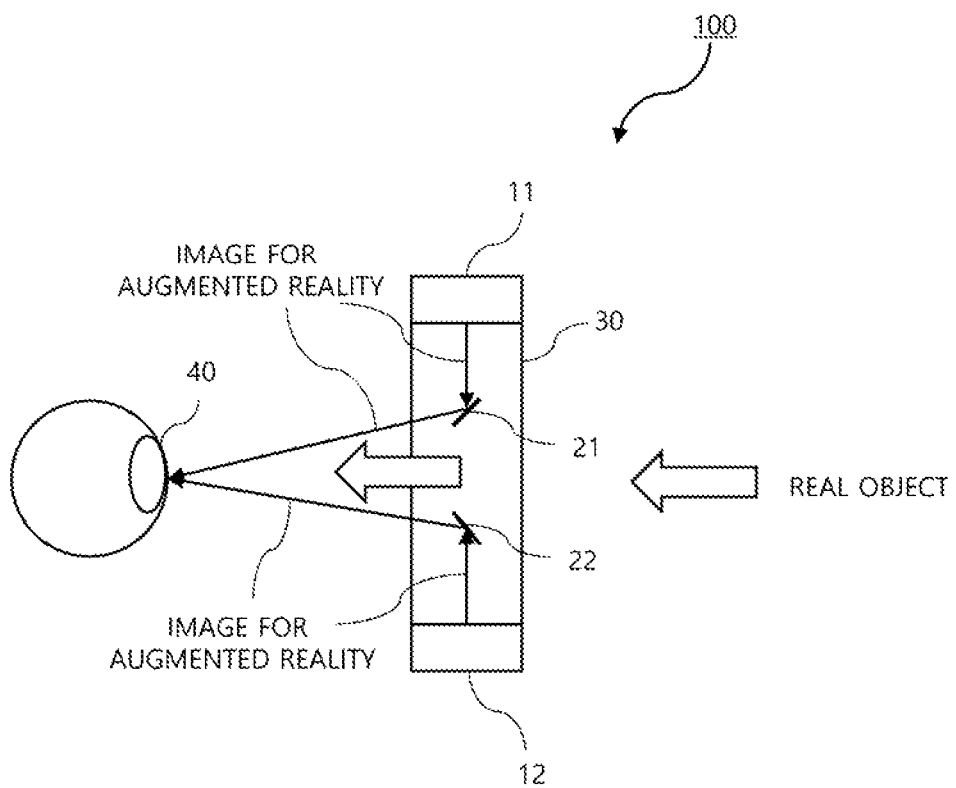
FIG. 2 is a side view of an optical device (100) for augmented reality according to the present invention.
Figure 3:
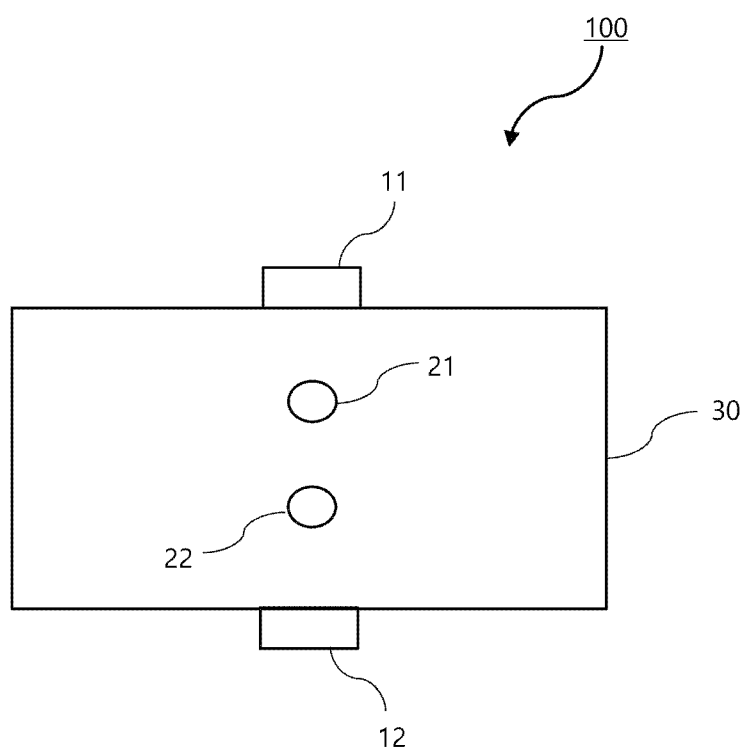
FIG. 3 is a front view of the optical device (100) for augmented reality according to the present invention.
Figure 4:
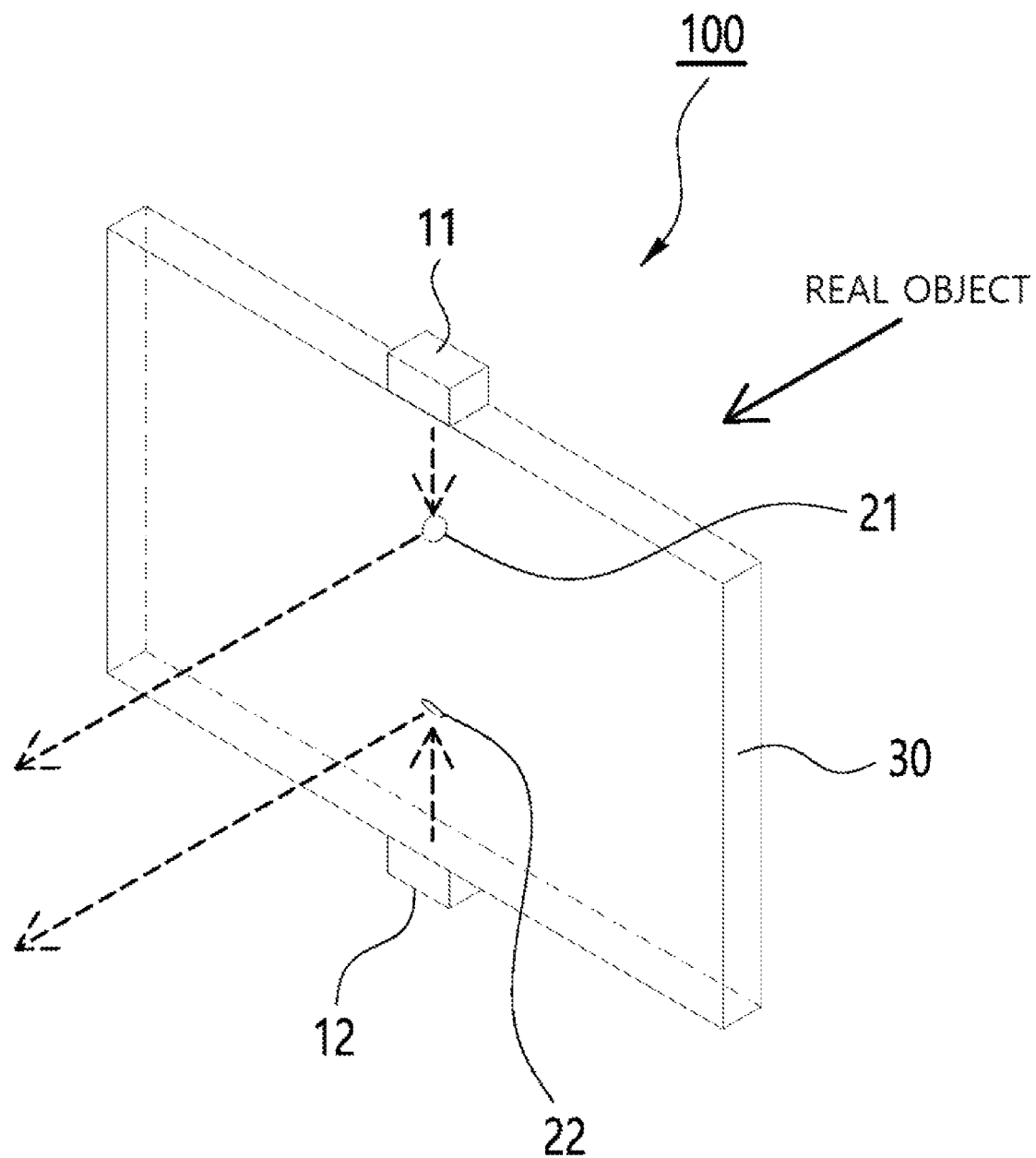
FIG. 4 is a perspective view of the optical device (100) for augmented reality according to the present invention.

FIGS. 2 to 4 are diagrams showing the overall configuration of an optical device 100 for augmented reality using a plurality of images for augmented reality according to an embodiment of the present invention, wherein FIG. 2 is a side view of the optical device 100 for augmented reality, FIG. 3 is a front view thereof, and FIG. 4 is a perspective view thereof.

Referring to FIGS. 2 to 4, the optical device 100 for augmented reality using a plurality of images for augmented reality according to the present embodiment includes a plurality of image output units 11 and 12, a plurality of reflective units 21 and 22, and an optical means 30.

The plurality of image output units 11 and 12 is means each of which outputs image light corresponding to an image for augmented reality.

The image output units 11 and 12 may be display devices such as small-sized LCDs that display images for augmented reality on screens and output image light from the screens by themselves, or may be reflective or refractive means that transfer image light, output from display devices, to the reflective units 20 by reflecting or refracting the image light.

In other words, the image output units 11 and 12 refer to display devices that display images for augmented reality and output image light corresponding to the images for augmented reality, or refer to other various means such as reflective or refractive means that transfer image light, output from display devices, to the reflective units 20.

Since these image output units 11 and 12 themselves are not direct targets of the present invention and are known in the prior art, a detailed description thereof will be omitted.

Meanwhile, here, the image for augmented reality refers to a virtual image transferred to the pupil 40 of a user by the optical device 100 for augmented reality according to the present invention, and may be a still image or a moving image.

Such an image for augmented reality is output as image light from the image output units 11 and 12 and then transferred to the pupil 40 of the user by the reflective units 21 and 22, so that a virtual image is provided to the user. At the same time, the user directly gazes at image light output from a real object present in the real world through the optical means 10 with his/her eye. Accordingly, the user is provided with an augmented reality service.

Meanwhile, in this case, the plurality of image output units 11 and 12 may output rays of image light corresponding to a plurality of partial images for augmented reality obtained by dividing a single image for augmented reality into a plurality of partial images for augmented reality.

In the embodiment of FIGS. 2 to 4, the two image output units 11 and 12 are disposed on the top and bottom portions respectively, and rays of image light corresponding to images for augmented reality and output from the image output units 11 and 12 are transferred to the pupil 40 through the reflective units 21 and 22. In this case, a single image for augmented reality may be divided into two, upper and lower images for augmented reality, and these images may be output through the upper and lower image output units 11 and 12, respectively.

Figure 5:
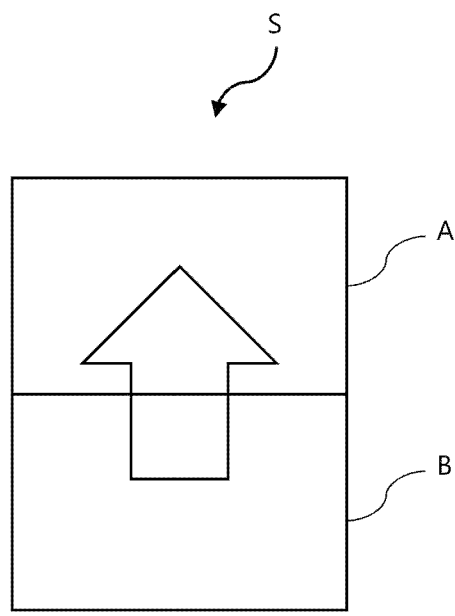
FIG. 5 is a diagram illustrating an example of an image for augmented reality.

FIG. 5 is a diagram illustrating an example of an image for augmented reality.

Referring to FIG. 5, a single image S for augmented reality is divided into two images A and B, and the upper image A is output through the image output unit 11 disposed above in FIGS. 2 to 4 and the lower image B is output through the image output unit 12 disposed below in FIGS. 2 to 4.

Although the image output units 11 and 12 are shown as being two in FIGS. 2 to 5, it is exemplary, and it is obvious that three or more image output units may be provided as needed.

Referring again to FIGS. 2 to 4, the reflective units 21 and 22 will be described.

The reflective units 21 and 22 include a plurality of reflective units, and are means for transferring rays of image light corresponding to images for augmented reality and output from the plurality of image output units 11 and 12, respectively, to the pupil 40 of an eye of the user by reflecting the rays of image light toward the pupil 40, thereby providing the images for augmented reality to the user.

The number of the reflective units 21 and 22 is equal to or larger than the number of the image output units 11 and 12. Each of the reflective units 21 and 22 corresponds to at least one of the plurality of image output units, and transfers image light corresponding to an image for augmented reality and output from the corresponding image output unit 11 or 12 to the pupil 40 of an eye of the user by reflecting the corresponding image light toward the pupil 40.

In other words, each of the reflective units 21 and 22 corresponds to at least any one of the image output units 11 and 12, and transfers image light output from the corresponding image output unit 11 or 12 to the pupil 40 by reflecting the image light toward the pupil 40. When the number of reflective units 21 and 22 is larger than that of the image output units 11 and 12, at least any one of the image output units 11 and 12 may correspond to two or more reflective units 21 and 22.

In the embodiment of FIGS. 2 to 5, the upper reflective unit 21 corresponds to the image output unit 11 disposed above and reflects the image light output from this image output unit 11 toward the pupil 40, whereas the lower reflective unit 22 corresponds to the image output unit 12 disposed below and reflects the image light output from this image output unit 12 toward the pupil 40.

Accordingly, the plurality of reflective units 21 and 22 is disposed between the image output units 11 and 12 and the pupil 40 at respective different inclination angles with respect to the surface of the optical means 30, as shown in FIG. 2, so that each of the plurality of reflective units 21 and 22 can reflect image light, output from at least one corresponding image output unit 11 or 12, toward the pupil 40.

Meanwhile, although the plurality of reflection units 21 and 22 may be disposed on the surface of the optical means 30, they are preferably disposed in a form embedded in the optical means 30, as shown in FIGS. 2 to 4.

Meanwhile, the reflective units 21 and 22 are formed to have a size smaller than the size of the human pupil i.e., 8 mm or less, more preferably 4 mm, in order to obtain a pinhole effect by increasing the depth of field as described in the background art section.

By forming the reflective units 21 and 22 to have a size smaller than the common size of the human pupil, the depth of field for light entering the pupil through the reflective units 21 and 22 can be made almost infinite, i.e., considerably deep. Accordingly, there can be achieved a pinhole effect that allows an image for augmented reality to be always recognized as being in focus regardless of a change in the focal length even when a user changes the focal length for the real world while gazing at the real world.

The reflective units 21 and 22 are formed to have a size of 8 mm or less, which is smaller than the common size of the human pupil, more preferably a size in the range of 0.5 to 4 mm.

Meanwhile, at least some of the reflective units 21 and 22 may be composed of a plurality of reflective modules.

Figure 6:
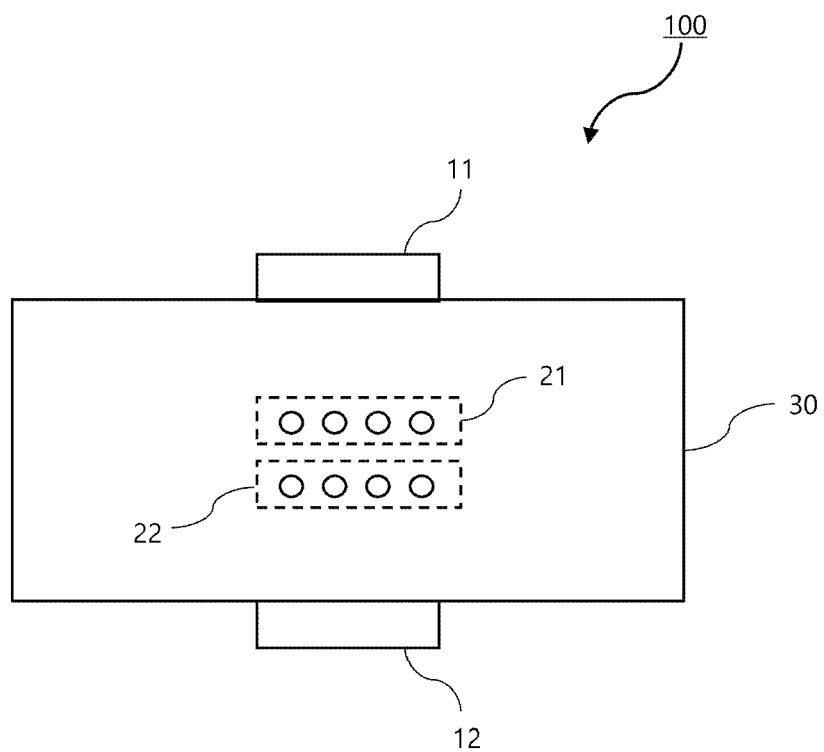
FIG. 6 is a diagram illustrating a case in which a plurality of reflective units (21 and 22) is each composed of a plurality of reflective modules.

FIG. 6 is a diagram illustrating a case in which reflective units 21 and 22 are each composed of a plurality of reflective modules.

As shown in FIG. 6, it can be seen that each of the reflective units 21 and 22 is composed of four reflective modules. In this case, as shown in FIG. 6, each of the reflective modules constituting one of the reflective units 21 and 22 is arranged such that the image light corresponding to images for augmented reality and output from the image output units 11 and 12 to each of the reflective modules is not blocked by other reflective modules.

Even in this case, each of the reflective modules are formed to have a size of 8 mm or less, more preferably a size in the range of 0.5 to 4 mm.

The optical means 30 is a means that transmits at least a part of the image light output from a real object therethrough to the pupil 40 of an eye of a user. Furthermore, the above-described reflective units 21 and 22 are disposed inside the optical means 30 or on the surface of the optical means 30.

The optical means 30 may be implemented using a material such as glass or transparent plastic. The optical means 30 is disposed in front of the pupil 40 of the user in use, and transmits image light output from a real object present in the real world therethrough to the pupil 40. The optical means 30 may be implemented using a translucent material, in which case the image light output from a real object is partially transmitted to the pupil 40 through the optical means 30.

The optical means 30 may be coupled to the surface of the lens of a glasses-type augmented reality provision device (not shown), composed of a lens and a frame, in a module form. Alternatively, the lens itself of the augmented reality provision device may be implemented as the optical means 30.

Meanwhile, although the rays of image light corresponding to images for augmented reality and output from the image output units 11 and 12 may be directly transmitted to the reflective units 21 and 22, they may be transmitted after being reflected at least once from the inner surface of the optical means 30.

In other words, the rays of image light corresponding to images for augmented reality and output from at least some of the image output units 11 and 12 may be transmitted to the corresponding reflection units 21 and 22 after being reflected at least once from the inner surface of the optical means 30.

Figure 7:
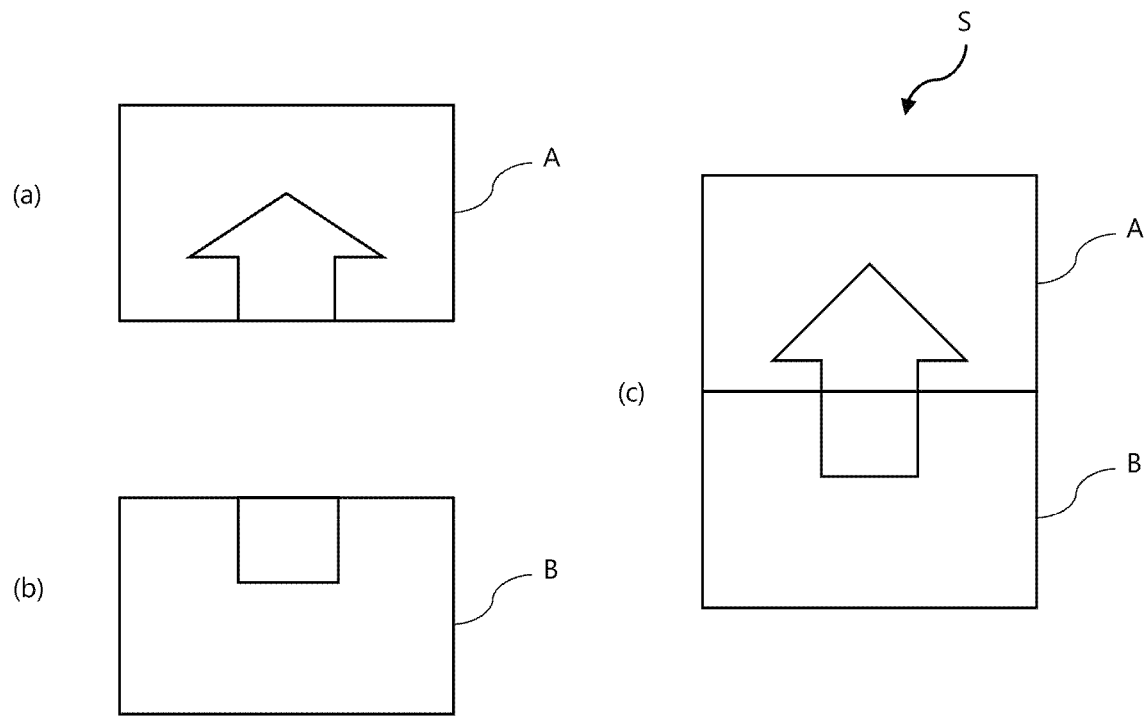
FIG. 7 shows diagrams illustrating the effects of the embodiment described with reference to FIGS. 2 to 6.

FIG. 7 shows diagrams illustrating the effects of the embodiment described with reference to FIGS. 2 to 6.

FIG. 7(a) illustrates the image A of images for augmented reality shown to a user when entering the pupil 40 only through the image output unit 11 and the reflective unit 21, as shown in FIG. 5, and FIG. 7(b) illustrates the image B of images for augmented reality shown to a user when entering the pupil 40 only through the image output unit 12 and the reflective unit 22. In addition, FIG. 7(c) illustrates a state in which the image output units 11 and 12 and the reflective units 12 and 22 operate together and thus both the images A and B are shown to a user.

Therefore, there is an advantage in that a case where the plurality of image output units 11 and 12 is used as in the present invention may provide a wider image for augmented reality than a case where a single image output unit is used.

Figure 8:
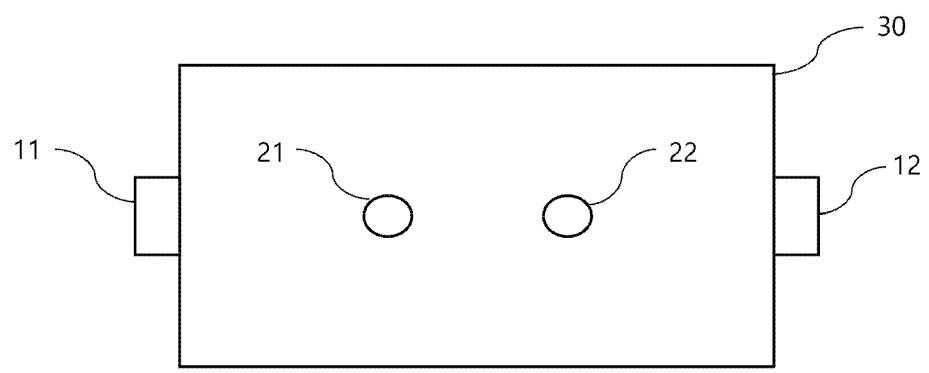
FIG. 8 is a front view of an optical apparatus (100) for augmented reality using a plurality of images for augmented reality according to another embodiment of the present invention.

FIG. 8 is a front view of an optical apparatus 100 for augmented reality using a plurality of images for augmented reality according to another embodiment of the present invention.

The embodiment of FIG. 8 is basically the same as the embodiment described with reference to FIGS. 2 to 7, however, the embodiment of FIG. 8 is different in that two image output units 11 and 12 are disposed on the left and right sides and reflective units 21 and 22 are also arranged in the lateral direction accordingly.

Figure 9:
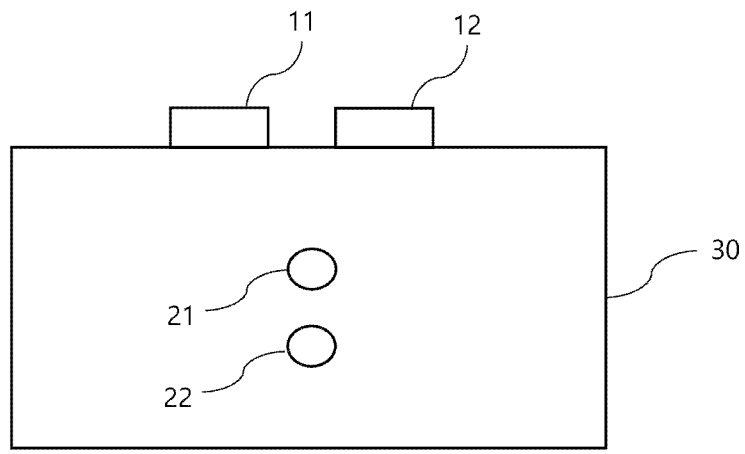
FIG. 9 is a front view of an optical apparatus (100) for augmented reality using a plurality of images for augmented reality according to still another embodiment of the present invention.

FIG. 9 is a front view of an optical apparatus 100 for augmented reality using a plurality of images for augmented reality according to still another embodiment of the present invention.

The embodiment of FIG. 9 is also basically the same as the embodiment described with reference to FIGS. 2 to 7, however, the embodiment of FIG. 9 is different in that two image output units 11 and 12 are disposed on the top and reflective units 21 and 22 are also arranged in the vertical direction accordingly.

Figure 10:
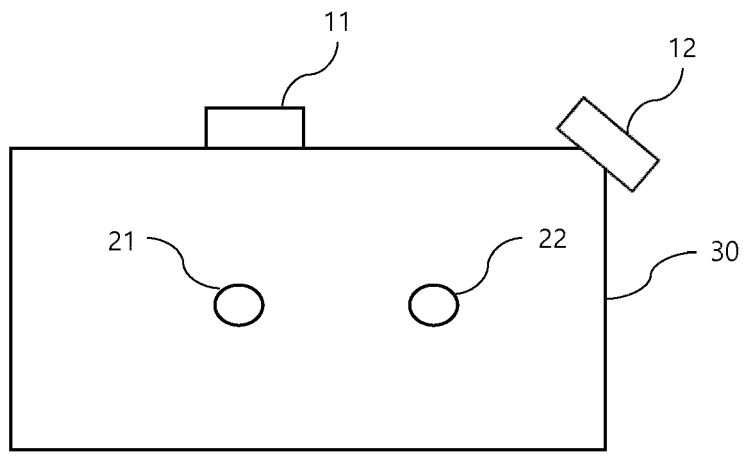
FIG. 10 is a front view of an optical apparatus (100) for augmented reality using a plurality of images for augmented reality according to still another embodiment of the present invention.

FIG. 10 is a front view of an optical apparatus 100 for augmented reality using a plurality of images for augmented reality according to still another embodiment of the present invention.

The embodiment of FIG. 10 is also basically the same as the embodiment described with reference to FIGS. 2 to 7, however, the embodiment of FIG. 10 is different in that one image output unit 11 is disposed on the top and the other image output portion 12 is disposed at one upper corner.

Figure 11:
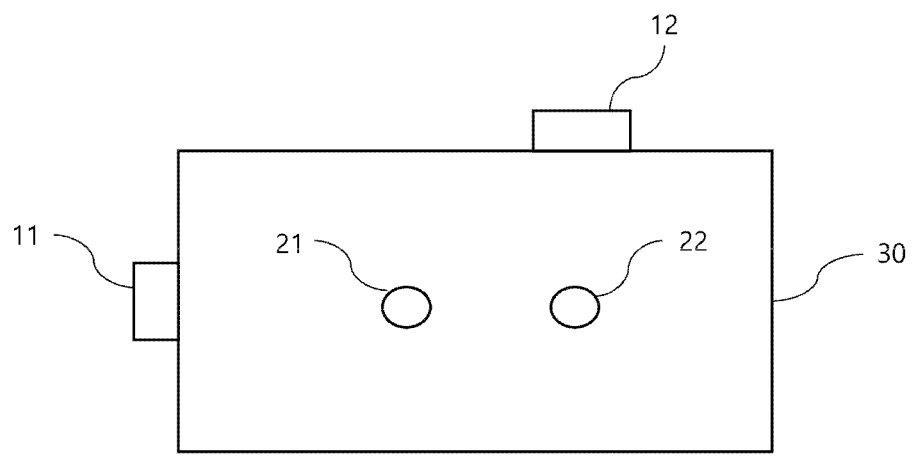
FIG. 11 is a front view of an optical apparatus (100) for augmented reality using a plurality of images for augmented reality according to still another embodiment of the present invention.

FIG. 11 is a front view of an optical apparatus 100 for augmented reality using a plurality of images for augmented reality according to still another embodiment of the present invention.

The embodiment of FIG. 11 is also basically the same as the embodiment described with reference to FIGS. 2 to 7, however, the embodiment of FIG. 10 is different in that one image output unit 11 is disposed on the top and the other image output portion 12 is disposed on one side.

Figure 12:
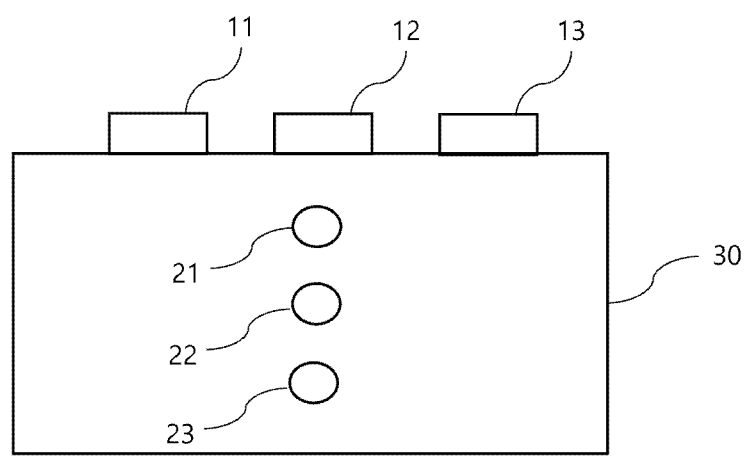
FIG. 12 is a front view of an optical apparatus (100) for augmented reality using a plurality of images for augmented reality according to still another embodiment of the present invention.

FIG. 12 is a front view of an optical apparatus 100 for augmented reality using a plurality of images for augmented reality according to still another embodiment of the present invention.

The embodiment of FIG. 12 is also basically the same as the embodiment described with reference to FIGS. 2 to 7, however, the embodiment of FIG. 12 is different in that three image output units 11, 12, and 13 are disposed next to one another on the top.

In this case, three reflective units 21, 22, and 23 are also arranged at different inclination angles in order to correspond to the respective image output units 11, 12, and 13.

Figure 13:
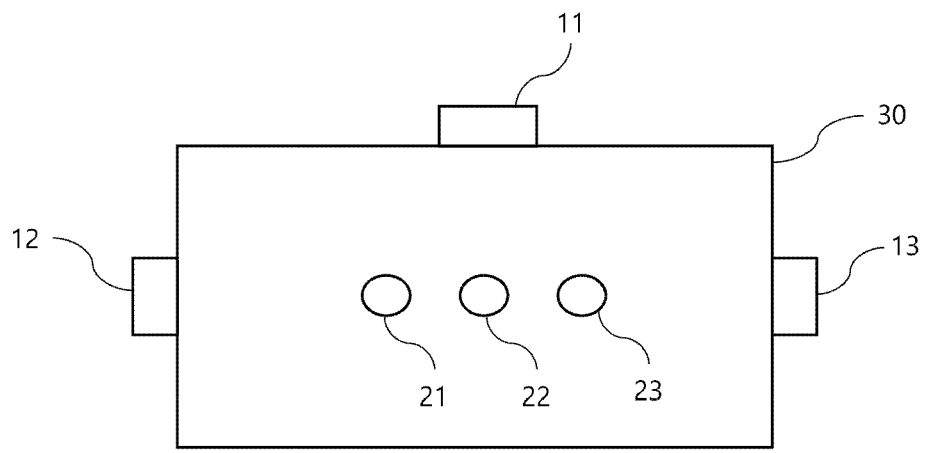
FIG. 13 is a front view of an optical apparatus (100) for augmented reality using a plurality of images for augmented reality according to still another embodiment of the present invention.

FIG. 13 is a front view of an optical apparatus 100 for augmented reality using a plurality of images for augmented reality according to still another embodiment of the present invention.

The embodiment of FIG. 13 is also basically the same as the embodiment described with reference to FIGS. 2 to 7, however, the embodiment of FIG. 12 is different in that one image output unit 11 is disposed on the top and two image output units 12 and 13 are disposed on two opposite sides, respectively.

In this case, three reflective units 21, 22, and 23 are also arranged at inclination angles in order to correspond to the respective image output parts 11, 12, and 13.

Figure 14:
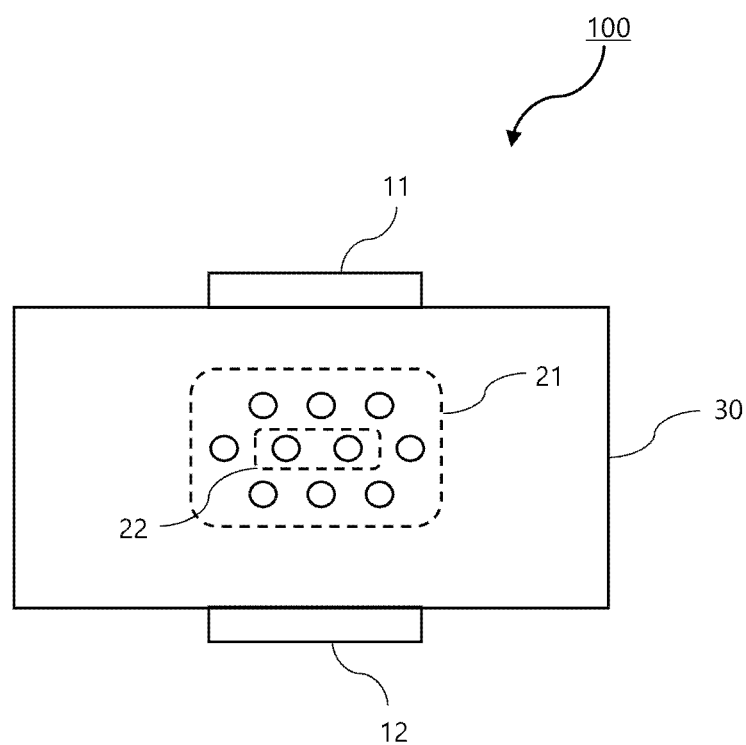
FIGS. 14 and 15 are front and side views of an optical apparatus (100) for augmented reality using a plurality of images for augmented reality according to still another embodiment of the present invention.
Figure 15:
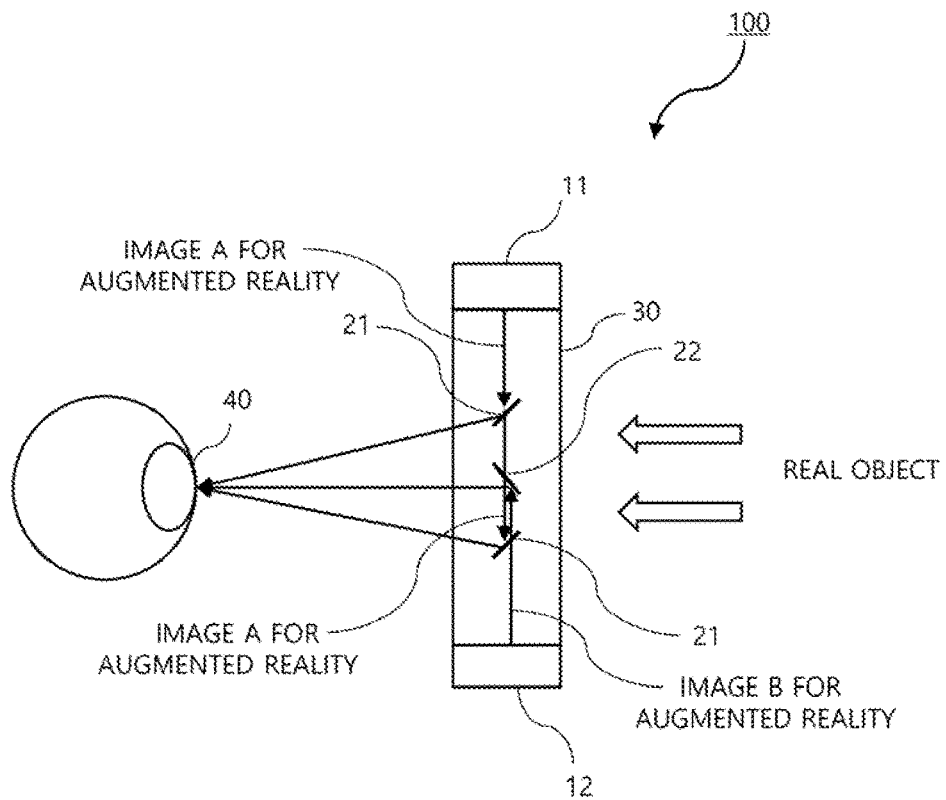

FIGS. 14 and 15 are front and side views of an optical apparatus 100 for augmented reality using a plurality of images for augmented reality according to still another embodiment of the present invention.

The embodiment of FIGS. 14 and 15 is also basically the same as the embodiment described with reference to FIGS. 2 to 7, however, the embodiment of FIGS. 14 and 15 is different in that at least a part of a plurality of reflective units is disposed in the central portion of an optical means 30 and one or more reflective units other than the reflective unit disposed in the central portion of the optical means 30 are arranged to surround the reflective unit disposed in the central portion of the optical means 30.

In FIGS. 14 and 15, the present embodiment is different in that a reflective unit 22 including two reflective modules is located in the central portion of the optical means 30 and another reflective unit 21 including eight reflective modules is disposed to surround the reflective unit 21.

The reflective unit 21 disposed on the outer side transfers an image A for augmented reality output from the upper image output unit 11, which is one of the image output units 11 and 12 disposed on the upper and lower sides of the optical means 30, to the pupil 40 by reflecting the image A for augmented reality. The reflective unit 22 disposed in the central portion transfers an image B for augmented reality output from the lower one 12 of the image output units 11 and 12 disposed on the upper and lower sides of the optical means 30 to the pupil 40 by reflecting the image B for augmented reality.

Figure 16:
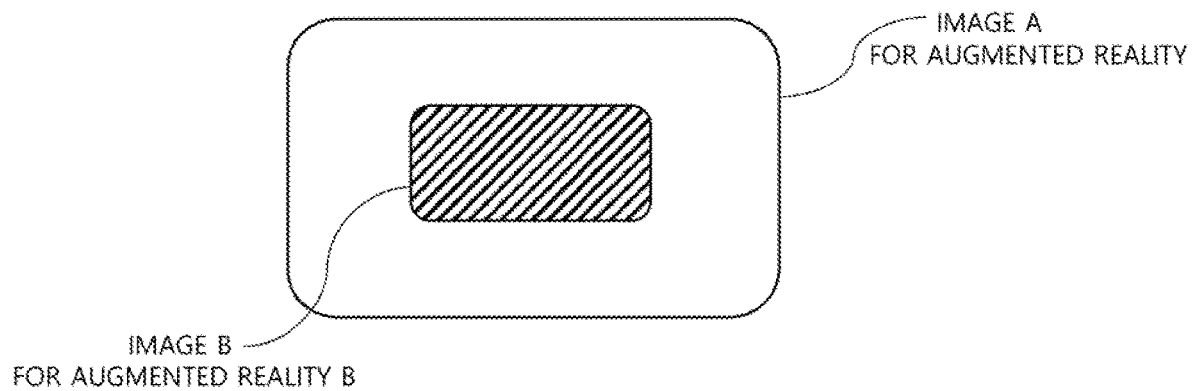
FIG. 16 shows an example of an image for augmented reality recognized by a user according to the embodiment of FIGS. 14 and 15.

FIG. 16 shows an example of an image for augmented reality recognized by a user according to the embodiment of FIGS. 14 and 15.

As shown in FIG. 16, an image for augmented reality recognized through the pupil 40 of a user is formed such that an image B for augmented reality transferred through the reflective unit 22 is disposed in the central portion and an image A for augmented reality transferred through the reflective unit 21 surrounds the image B for augmented reality.

By using this, the image A for augmented reality and the image B for augmented reality may be provided as different images for augmented reality instead of partial images into which a single image for augmented reality is divided, in which case there is an advantage in that a plurality of different images for augmented reality are provided in an overlapped form.

In this case, the resolutions of the images for augmented reality may be different from each other.

Alternatively, a single image for augmented reality may be composed of a full screen and a central portion screen, and the image A for augmented reality may be set as the full screen and the image B for augmented reality may be set as the central portion screen. In this case, the reflective unit 22 disposed in the central portion of the optical means 30 may transfer the image light, output from the image output unit 12 for outputting a high-resolution image for augmented reality, to the pupil 40 of a user by reflecting the image light, and the reflective unit 21 disposed to surround the reflective unit 22 disposed in the central portion may transfer the image light, output from the image output unit 11 for outputting an image for augmented reality having lower resolution than the high-resolution image for augmented reality, to the pupil 40 of the user by reflecting the image light.

In other words, the image B for augmented reality, which is a central portion screen, may be set as a high-resolution image for augmented reality, and the image A for augmented reality, which is a full screen, may be set as an image for augmented reality having lower resolution than the image B for augmented reality. In this way, only the image output unit 12 for outputting the image B for augmented reality that is a central portion screen may be implemented using an expensive device capable of providing an high-resolution image, and the image output unit 11 for outputting the image A for augmented reality that is a full screen may be implemented using an inexpensive device capable of providing a low-resolution image. Accordingly, there is an advantage in that it may be possible to provide a high-resolution image for augmented reality only for a portion corresponding to a central field of view recognized as important by humans without implementing all the image output units 11 and 12 using high-resolution devices.

Furthermore, the plurality of image output units 11 and 12 may output respective rays of image light corresponding to images for augmented reality so that the rays of image light have different angular resolutions.

In this case, the angular resolution generally refers to a resolution that enables black and white lines to be distinguished from each other in the range of one degree, and is usually expressed in cycles/degree (CPD). In other words, the angular resolution refers to the resolution in the range of the field of view that is recognized by a human. It can be seen that even for images having a resolution of the same dots per inch (DPI), an image having a narrow field of view has a higher angular resolution than an image having a wide field of view.

Accordingly, a single image for augmented reality may be composed of a full screen and a central portion screen, and the image A for augmented reality may be set as the full screen and the image B for augmented reality may be set as the central portion screen. Then, the reflective unit 22 disposed in the central portion of the optical means 30 may transfer image light corresponding to an image for augmented reality output from the image output unit 12 for imparting high angular resolution to the pupil 40 of the user by reflecting the image light, and the reflective unit 21 disposed to surround the reflective unit 22 disposed in the central portion may transfer image light corresponding to an image for augmented reality output from the image output part 11 for imparting lower angular resolution than the high angular resolution image for augmented reality to the pupil 40 of the user by reflecting the image light.

Figure 17:
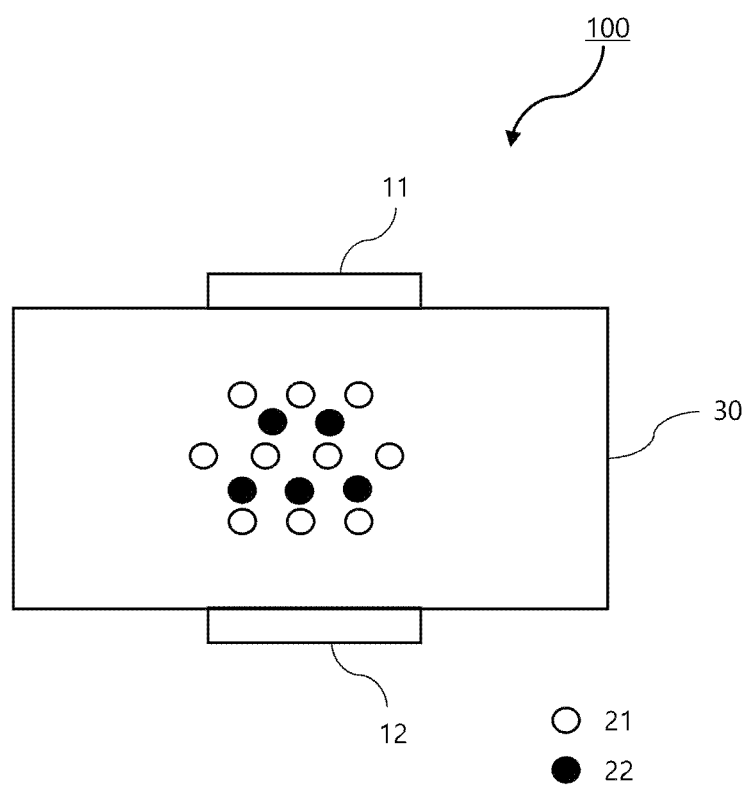
FIG. 17 is a front view of an optical apparatus (100) for augmented reality using a plurality of images for augmented reality according to still another embodiment of the present invention.

FIG. 17 is a front view of an optical apparatus 100 for augmented reality using a plurality of images for augmented reality according to still another embodiment of the present invention.

Although the embodiment of FIG. 17 is similar to the embodiment described with reference to FIGS. 14 to 16, the embodiment of FIG. 17 is different in that reflective units 21 and 22 corresponding to image output units 11 and 12 are alternately arranged.

In other words, the reflective units 22 indicated by black circles and the reflective units 21 indicated by white circles are alternately arranged in rows. The reflective units 22 indicated by black circles correspond to the lower image output unit 12, and the reflective units 21 indicated by white circles correspond to the upper image output unit 11. The reflective units 21 and 22 transfer image light corresponding to images for augmented reality output from the image output units 11 and 12 to the pupil 40 by reflecting the image light.

Although the reflective units 21 and 22 are alternately arranged in rows in the embodiment of FIG. 17, this is exemplary, and they may be alternately arranged in columns according to the directions of the image output units 11 and 12.

Furthermore, reflective modules constituting the reflective units 21 and reflective modules constituting the reflective units 22 may be alternately disposed with each other.

Meanwhile, although the case where one image output unit 11 or 12 outputs image light corresponding to one imager for augmented reality has been described as an example in the above embodiments, one image output unit 11 or 12 may output image light corresponding to two or more images for augmented reality.

In other words, one or more image output units 11 and 12 are disposed. At least one of the image output units 11 and 12 outputs image light corresponding to a plurality of images for augmented reality. Then, there is disposed the plurality of reflective units 21 that transfers image light corresponding to a plurality of images for augmented reality and output from the image output units 11 and 12 toward the pupil of an eye of a user by reflecting the image light, thereby providing images for augmented reality to the user.

In this case, each of the plurality of reflective units 21 and 22 corresponds to at least one of the plurality of images for augmented reality output from the image output units 11 and 12, and transfers image light corresponding to the corresponding image for augmented reality to the pupil 40 of an eye of the user by reflecting the image light toward the pupil 40.

In this case, since each of the reflective units 21 and 22 corresponds to at least any one of the plurality of images for augmented reality output from the image output units 11 and 12, the reflective units 21 and 22 are formed such that the number of reflective units is larger than the sum of the numbers of images for augmented reality output from the individual image output unit 11 and 12.

Although the present embodiment is different from the above-described embodiments in that at least one image output unit 11 or 12 outputs image light corresponding to two or more images for augmented reality, other configurations may be applied in the same manner, and thus detailed descriptions thereof will be omitted.

While the present invention has been described with reference to the preferred embodiments of the present invention, it is obvious that the present invention is not limited to the embodiments and other various modifications and alterations are possible.

The invention claimed is:

1. An optical device for augmented reality using a plurality of images for augmented reality, the optical device comprising:
   a plurality of image output units configured to output respective rays of image light corresponding to images for augmented reality;
   a plurality of reflective units configured to transfer the respective rays of image light corresponding to the images for augmented reality and output from the plurality of image output units to a pupil of an eye of a user by reflecting the image light toward the pupil, thereby providing the images for augmented reality to the user; and
   an optical means in which the reflective units are disposed and configured to transmit at least part of image light output from a real object therethrough toward the pupil of the eye of the user;
   wherein each of the plurality of reflective units corresponds to at least any one of the plurality of image output units, and transfers image light corresponding to an image for augmented reality and output from the corresponding image output unit to the pupil of the eye of the user by reflecting the image light toward the pupil,
   wherein at least a part of the plurality of reflective units is disposed in a central portion of the optical means, and one or more reflective units other than the reflective unit disposed in the central portion of the optical means are arranged to surround the reflective unit disposed in the central portion of the optical means,
   wherein the plurality of image output units outputs respective rays of image light corresponding to images for augmented reality having different resolutions, and
   wherein a resolution of an image for augmented reality corresponding to image light transferred to the pupil by the reflective unit disposed in the central portion of the optical means is higher than a resolution of an image for augmented reality corresponding to image light transferred to the pupil by the reflective units disposed to surround the reflective unit disposed in the central portion of the optical means.

2. The optical device of claim 1, wherein a size of the reflective units is formed to be 4 mm or less.

3. The optical device of claim 1, wherein the image output units divide one image for augmented reality into a plurality of partial images for augmented reality, and output respective rays of image light corresponding to the plurality of partial images for augmented reality.

4. The optical device of claim 1, wherein each of the plurality of reflective units is disposed at a different inclination angle with respect to a surface of the optical means between a corresponding one of the image output units and the pupil so that each of the reflective units can reflect image light from the corresponding image output unit toward the pupil respectively.

5. The optical device of claim 4, wherein the reflective units are disposed inside the optical means or on the surface of the optical means.

6. The optical device of claim 1, wherein at least a part of the reflective units is composed of a plurality of reflective modules having a size of 4 mm or less.

7. The optical device of claim 6, wherein each of reflective modules constituting one of the reflective units is arranged such that image light corresponding to an image for augmented reality and output from a corresponding one of the image output units is not blocked by one or more other reflective modules.

8. The optical device of claim 1, wherein image light corresponding to an image for augmented reality and output from at least a part of the plurality of image output units is transferred to a corresponding one of the reflective units after being reflected at least once from an inner surface of the optical means.

9. The optical device of claim 1, wherein each of the reflective units arranged to surround the reflective unit disposed in the central portion of the optical means is composed of a plurality of reflective modules.

10. The optical device of claim 1, wherein the plurality of image output units outputs respective rays of image light corresponding to different images for augmented reality.

11. The optical device of claim 1, wherein the plurality of image output units outputs respective rays of image light corresponding to images for augmented reality so that the images for augmented reality have different angular resolutions.

12. An optical device for augmented reality using a plurality of images for augmented reality, the optical device comprising:
one or more image output units configured to output image light corresponding to images for augmented reality, wherein at least any one of the image output units outputs image light corresponding to a plurality of images for augmented reality;
a plurality of reflective units configured to transfer the image light corresponding to the plurality of images for augmented reality output from the image output units to a pupil of an eye of a user by reflecting the image light toward the pupil, thereby providing the images for augmented reality to the user; and
an optical means in which the reflective units are disposed and configured to transmit at least part of image light output from a real object therethrough toward the pupil of the eye of the user;
wherein each of the plurality of reflective units corresponds to at least any one of the plurality of images for augmented reality output from the image output units, and transfers image light corresponding to the corresponding image for augmented reality to the pupil of the eye of the user by reflecting the image light toward the pupil,
wherein at least a part of the plurality of reflective units is disposed in a central portion of the optical means, and one or more reflective units other than the reflective unit disposed in the central portion of the optical means are arranged to surround the reflective unit disposed in the central portion of the optical means,
wherein the one or more image output units outputs respective rays of image light corresponding to images for augmented reality having different resolutions, and
wherein a resolution of an image for augmented reality corresponding to image light transferred to the pupil by the reflective unit disposed in the central portion of the optical means is higher than a resolution of an image for augmented reality corresponding to image light transferred to the pupil by the reflective units disposed to surround the reflective unit disposed in the central portion of the optical means.

13. The optical device of claim 12, wherein a size of the reflective units is formed to be 4 mm or less.

14. The optical device of claim 12, wherein the image output units divide one image for augmented reality into a plurality of partial images for augmented reality, and output image light corresponding to the plurality of partial images for augmented reality.

15. The optical device of claim 12, wherein each of the plurality of reflective units is disposed at a different inclination angle with respect to a surface of the optical means between a corresponding one of the image output units and the pupil so that the reflective unit can reflect image light corresponding to an image for augmented reality from the corresponding image output unit toward the pupil.

16. The optical device of claim 15, wherein the reflective units are disposed inside the optical means or on the surface of the optical means.

17. The optical device of claim 12, wherein at least a part of the reflective units is composed of a plurality of reflective modules having a size of 4 mm or less.

18. The optical device of claim 17, wherein each of reflective modules constituting one of the reflective units is arranged such that image light corresponding to an image for augmented reality and output from a corresponding one of the image output units is not blocked by one or more other reflective modules.

19. The optical device of claim 12, wherein image light corresponding to an image for augmented reality and output from at least a part of the plurality of image output units is transferred to a corresponding one of the reflective units after being reflected at least once from an inner surface of the optical means.

* * * * *